US008221230B2

(12) United States Patent
Reeves, III

(10) Patent No.: US 8,221,230 B2
(45) Date of Patent: Jul. 17, 2012

(54) VIDEO GAMING DEVICE AND METHOD OF WAGERING ON A VIRTUAL FOOTBALL GAME

(75) Inventor: Allen N. Reeves, III, Tampa, FL (US)

(73) Assignee: ProVSports, Inc., Brandon, FL (US)

(*) Notice: Subject to any disclaimer, the term of this patent is extended or adjusted under 35 U.S.C. 154(b) by 3 days.

(21) Appl. No.: 12/888,514

(22) Filed: Sep. 23, 2010

(65) Prior Publication Data

US 2012/0004018 A1 Jan. 5, 2012

Related U.S. Application Data

(63) Continuation-in-part of application No. 11/804,606, filed on May 18, 2007, now Pat. No. 7,901,286.

(51) Int. Cl.
*G06F 17/00* (2006.01)

(52) U.S. Cl. .......................................................... 463/25

(58) Field of Classification Search .................. 463/1–9, 463/16–25; 273/138.1

See application file for complete search history.

(56) References Cited

U.S. PATENT DOCUMENTS 7,883,403 B2 * 2/2011 Low et al. ........................ 463/16
8,091,111 B2 * 1/2012 Logan et al. .................. 725/110
2002/0137580 A1 * 9/2002 Hodge et al. .................. 473/415
2003/0119578 A1 * 6/2003 Newson ........................... 463/20
2005/0005308 A1 * 1/2005 Logan et al. .................. 725/135
2006/0183547 A1 * 8/2006 McMonigle ..................... 463/40
2011/0089638 A1 * 4/2011 Thomopoulos ............... 273/298
2011/0246579 A1 * 10/2011 Williams ...................... 709/206

* cited by examiner

*Primary Examiner* — Ronald Laneau

(74) *Attorney, Agent, or Firm* — McNair Law Firm, P.A.; Douglas W. Kim

(57) ABSTRACT

This invention is a computerized football game comprising steps to establishing and displaying a game clock, receiving the player's selection information representing a kickoff reception request, calculating a current field position according to the set of kickoff return results, (a) receiving the player's selection information representing an offensive play request from the set of predefined plays, (b) updating the current field position according to the deep zone set of play advancement information if the current position is in the deep zone or according to the mid zone set of play advancement information if the current position is in the mid zone or according to the near zone set of play advancement information is the current position is in the near zone and the goal line has not been reached or until a touchdown is achieved or the game clock expires or a first down is not achieved after four tries.

16 Claims, 23 Drawing Sheets

| Component | Description |
|---|---|
| Static Model Renderer | Used to render the stadium and incidental models including the Jumbotron, sideline creates, cherry pickers and so on. |
| Animation Library | Poses, animates, skins and renders the characters |
| Effect/Particle Renderer | The game requires some effects; 'smoke' puffs from the pitch as the player run, dirt/grass particles when they collide or fall to the ground with a progressive alpha particle system |
| Lens Flare | A particle type provided by the effects code above but tied to the camera instead of the world/animating character. |
| Point Lights | A limited number of standard point lights for general stadium lighting. |
| Texture System | The texture system supports 4 LOD's based upon regular Z, ignoring owner type, LOD's are automatically generated in the pipeline where possible. |
| Material Effects / Lights | Shades provide progressive and dynamic lighting effects and also material rendering effects for static and animated modes; these include environmental mapping, matte surfaces, wet surfaces and so on. |
| Crowd Renderer | The grand-stand crowds are rendered; stands are stripper automatically with quads and animated using unlit cookie-cut crowd texture; system supports crowd 'excitement' etc. by varying animation speeds / textures. |
| Incidental Character System | The game renders a number of sideline characters; these are characters stand on the side lines, (camera crews for example, reserve players cheer-leaders, etc). |
| Dynamic Camera | The engine supports a move-style camera that can basically move in any way; supports a number of camera types such as pan, tracked, chase and so forth. Because of the design of the stadium system however, FOV and other focal length/view point changes are not possible. |
| Viewpoint System | Plays are exported around a fixed original so they are movable any on the field. The stadium and camera system dynamically relocate according to the current yard offset and not the origin of the play sequence. |

Fig. 5A

| Component | Description |
|---|---|
| Scene Management | Determines what is drawn in the scene and what is culled |
| 2D Support | HUD Sprite & 2D animation support |
| Debug Font Suppot | Simply TTY & font rendering for debugging support / error display. |

Fig. 5B

| ASSET | DESCRIPTION |
|---|---|
| Static Models | Static Geometry, (no moving parts); sub-models are supported for culling but local transforms will be removed |
| Animated Models | Skins & skeletons for animating characters |
| Animation Data | Animation key-frames and curves to apply to animating characters |
| Simple Lights | Dynamic lights, (direction and point), will be baked into the static geometry but also carry through the pipeline for run-time character lighting |
| Material Effects | Per-face material effects, (shader and otherwise); includes vertex coloring |
| Motion Mixer: Character Paths | Translation/rotation data for animated character paths |
| Motion Mixer: Camera Paths | Translation/rotation data for moving cameras |
| Motion Mixer: Camera Types | Camera Types, (static/path/chase etc.) |
| Motion Mixer: Ball Path | Translation/rotation data for the ball |
| Local Event Tags | Embedded animation tags; used to trigger sounds, particle effects and local character events as required |
| Motion Mixer: Global Event Tags | Tags that follow the 'global' scene timeline; used to trigger events at specific places such as audio and commentary cues, crowd effects, camera switches, HUD display changes etc. |
| Incidental Characters | Models that are displayed as standing on the sideline |
| Shader Packaging | Shader scripts for advanced lighting/material effects |

Fig 6A

| Asset | Description |
|---|---|
| Audio | Mixed SFX tracks used for play simulation |
| Spoken Audio | Commentary and spoken audio streamed from the media source. |
| Music | Musical sequences |
| Textures | 2d images to be applied to models |
| 2D Sprites / Text | 2d elements displayed on the screen |
| HUD Display | On-screen display |
| Movies | Compression support |

Fig 6B

| Asset | File Format | Description |
|---|---|---|
| Maxx Assets | .MAX<br>.FBX | Max files will process only FBX exported files with the .FBX extension, The FBX file format inherently supports all features of .MAX scenes |
| Spoken Audio | .PCM<br>.OOG | Compressed formats will be supported by pipeline. |
| SFX Audio | .PCM<br>.OOG | Compressed formats will be supported by pipeline. |
| Textures | .TIF<br>.TGA<br>.PNG<br>.DDC | Pipeline will support a variety of different texture formats. |
| Movies | .BIK | Compressions format for movies. |

Fig. 7

| Asset Type | Details |
|---|---|
| In-Game 2D | Screen fades / wipes for start & end of scene, replays etc.<br>On-screen "TV logos & animation<br>Player / game stats & 2D effects<br>2D HUD as required |
| Presentation 2D | Background bitmaps<br>Buttons & Transitions<br>Text/Font<br>Additional front-end art as required |
| Presentation 3D | 3D User Interface models & textures |
| Incidentals | Particle textures / Highlight textures<br>Lens flare & field effects |

*Fig. 8*

| Asset Type | Details |
| --- | --- |
| On-Field Models | Quarterback<br>Receiver / Pass Defender - 4 body types<br>Offensive / Defensive Line men - 4 body types<br>Running back - 4 body types<br>Linebacker/Tight End<br>LODs: Near - 8000 faces<br>LODs: Mid-Near - 6000 faces<br>LODs: Mid-Far - 4000 faces<br>LODs: Far - 2000 faces<br>LOD Textures<br>Additional Textures: diffuse map<br>Additional Textures: bump map<br>Additional Textures: specular map<br>Additional Textures: Shader effects<br>Material per player<br>Skin tone textures |

Fig. 9A

| Asset Type | Details |
|---|---|
| On Field Official Models | Referee<br>LODs: Near - 8000 faces<br>LODs: Mid-Near - 6000 faces<br>LODs: Mid-Far - 4000 faces<br>LODs: Far - 2000 faces<br>LOD Textures<br>Additional Textures: diffuse map<br>Additional Textures: bump map<br>Additional Textures: specular map<br>Materials |
| Sideline Models | Coaches<br>Officials<br>Players<br>Press (cameramen, photographers, etc).<br>Cheerleaders<br>LODs: Mid-Near - 6000 faces<br>LODs: Mid-Far - 4000 faces<br>LOD Textures<br>Additional Textures: diffuse map<br>Additional Textures: bump map<br>Additional Textures: specular map<br>Materials |

Fig. 9B

| Asset Type | Details |
|---|---|
| Modeling | Modeling<br>Texturing & additional materials<br>Field & sideline modeling<br>Field & sidelines texturing<br>Lighting & finishing |
| Miscellaneous | Incidental objects; benches, coolers, cherry pickers, down markers, TV cameras<br>Billboards and advertising textures |

Fig. 10

| Asset Type | Details |
|---|---|
| Mooap Animations | Acquired through mocap animation library |
| Sideline Coaches | Waving<br>Shouting<br>Pacing<br>Idle |
| Sideline Players | Resting<br>Cheering<br>Pacing<br>Drinking |
| Sideline Misc. | Officials: Crouching<br>Officials: Hand Signals<br>Press: Taking photos<br>Cheerleaders: Choreographed cheers<br>Cheerleaders: Primping |
| Celebration Animations | On-Field<br>Off-Field |

Fig. 11

| Main | | | | | | |
|---|---|---|---|---|---|---|
| Yard Range | | Prob | Each Yard | Once Every | Payout | % |
| 90 | 99 | 0.000005 | 0.000001 | 200000 | 250 | 0.00125 |
| 75 | 89 | 0.000045 | 0.000003 | 22222 | 125 | 0.005625 |
| 60 | 74 | 0.000140 | 0.000009 | 7143 | 60 | 0.0084 |
| 45 | 59 | 0.000310 | 0.000210 | 3226 | 30 | 0.0093 |
| 30 | 44 | 0.005000 | 0.000333 | 200 | 15 | 0.075 |
| 15 | 29 | 0.040000 | 0.002267 | 25 | 6 | 0.24 |
| 4 | 14 | 0.010450 | 0.009500 | 10 | 3 | 0.3135 |
| -7 | 3 | 0.850000 | 0.077273 | 0 | 0 | 0 |
| | | 1.000000 | | | | |

| Kickoff | | | | | | |
|---|---|---|---|---|---|---|
| Yard Range | | Prob | Each Yard | Once Every | Payout | % |
| 90 | 99 | 0.000005 | 0.000001 | 200000 | 1000 | 0.005 |
| 80 | 89 | 0.000045 | 0.000005 | 22222 | 250 | 0.01125 |
| 70 | 79 | 0.001400 | 0.000014 | 7143 | 100 | 0.014 |
| 60 | 69 | 0.000310 | 0.000031 | 3226 | 75 | 0.02325 |
| 50 | 59 | 0.005000 | 0.000500 | 200 | 30 | 0.15 |
| 40 | 49 | 0.040000 | 0.004000 | 25 | 6 | 0.24 |
| 30 | 39 | 0.104500 | 0.010450 | 10 | 3 | 0.3135 |
| 8 | 29 | 0.850000 | 0.386360 | 1 | 0 | 0 |
| | | 1.000000 | | | | |

First Down Bonus 2^n X *Where n is the number of first downs accumulated this drive, including the current one
Touch Down Bonus 100 X

| Statistics | |
|---|---|
| Credits Bet | 28622360 |
| Credits Won | 25522665 |
| Payout % | 0.891704 |
| Total Plays | 5724484 |
| Average plays per drive | 5.72447 |
| Total Yards gained | 22954415 |
| Average Yards per drive | 22.9544 |
| Total first downs | 278946 |
| First Down Percent | 0.278946 |
| Hit % | 0.199335 |
| Total Touchdowns | 4306 |
| Average drives per touchdown | 232.0752 |

*Fig. 12*

| YARDS FOR KICKOFF RETURN | PROBABILITIES |
|---|---|
| 4-29 | 0.0000 |
| 30-39 | 0.2500 |
| 40-49 | 0.2000 |
| 50-59 | 0.1500 |
| 60-69 | 0.1200 |
| 70-79 | 0.1073 |
| 80-89 | 0.0838 |
| 90-99 | 0.0440 |
| TOUCH DOWN | 0.0150 |

FIGURE 14A

| Yards Gained For First Down | | Bonus |
|---|---|---|
| 1 | | 2 |
| 2 | | 3 |
| 3 | | 4 |
| 4 | | 6 |
| 5 | | 8 |
| 6 | | 10 |
| 7 | | 12 |
| 8 | | 15 |
| 9 | | 18 |
| 10 | | 25 |
| 11-20 | | 30 |
| 21-30 | | 40 |
| 31-40 | | 50 |
| 41-50 | | 75 |
| 49-40 (Opponent Field Position) | | 100 |
| 30-39 | " | 200 |
| 20-29 | " | 600 |
| 4-19 | " | 800 |
| From Kick Off Return | | 1000 |

FIGURE 14B

ON THE 10

| YARDS | PROB. | BREAKOUT CONTRIBUTION | PAY | |
|---|---|---|---|---|
| -2 Y | 0 | 144799 | 0 | 0.000 |
| -1 Y | 0 | 153825 | 0 | 0.000 |
| 0 Y | 672066 | 132840 | 0 | 0.000 |
| 1 Y | 0 | 124162 | 0 | 0.000 |
| 2 Y | 0 | 116440 | 0 | 0.000 |
| 3 Y | 163100 | 89900 | 1 | 0.090 |
| 4 Y | 0 | 73200 | 1 | 0.073 |
| 5 Y | 76770 | 43000 | 2 | 0.086 |
| 6 Y | 0 | 33770 | 2 | 0.068 |
| 7 Y | 0 | 26300 | 3 | 0.079 |
| 8 Y | 70376 | 23960 | 3 | 0.072 |
| 9 Y | 0 | 20116 | 3 | 0.060 |
| TOUCHDOWN | 17688 | 17688 | 25 | 0.442 |

Figure 15A

ON THE 15

| YARDS | PROB. | BREAKOUT CONTRIBUTION | PAY | |
|---|---|---|---|---|
| -2 Y | 0 | 82323 | 0 | 0.000 |
| -1 Y | 0 | 92328 | 0 | 0.000 |
| 0 Y | 586290 | 142986 | 0 | 0.000 |
| 1 Y | 0 | 125826 | 0 | 0.000 |
| 2 Y | 0 | 142827 | 0 | 0.000 |
| 3 Y | 246700 | 143350 | 1 | 0.143 |
| 4 Y | 0 | 103350 | 1 | 0.103 |
| 5 Y | 76978 | 43889 | 2 | 0.088 |
| 6 Y | 0 | 33089 | 2 | 0.066 |
| 7 Y | 0 | 18210 | 3 | 0.055 |
| 8 Y | 42630 | 15210 | 3 | 0.046 |
| 9 Y | 0 | 9210 | 3 | 0.028 |
| 10 Y | 37715 | 8800 | 4 | 0.035 |
| 11 Y | 0 | 7800 | 4 | 0.031 |
| 12 Y | 0 | 7305 | 4 | 0.029 |
| 13 Y | 0 | 7010 | 4 | 0.028 |
| 14 Y | 0 | 6800 | 4 | 0.027 |
| TOUCHDOWN | 9687 | 9687 | 30 | 0.291 |

Figure 15B

ON THE 50

| YARDS | PROB. | BREAKOUT | PAY | CONTRIBUTION |
|---|---|---|---|---|
| -2 Y | 0 | 55000 | 0 | 0.0000 |
| -1 Y | 0 | 90110 | 0 | 0.0000 |
| 0 Y | 662056 | 132055 | 0 | 0.0000 |
| 1 Y | 0 | 163171 | 0 | 0.0000 |
| 2 Y | 0 | 221720 | 0 | 0.0000 |
| 3 Y | 206661 | 123350 | 1 | 0.1234 |
| 4 Y | 0 | 83311 | 1 | 0.0833 |
| 5 Y | 33400 | 16700 | 2 | 0.0334 |
| 6 Y | 0 | 16700 | 2 | 0.0334 |
| 7 Y | 0 | 12000 | 3 | 0.0360 |
| 8 Y | 30600 | 10300 | 3 | 0.0309 |
| 9 Y | 0 | 8300 | 3 | 0.0249 |
| 10 Y | 43800 | 7300 | 4 | 0.0292 |
| 11 Y | 0 | 6500 | 4 | 0.0260 |
| 12 Y | 0 | 5600 | 4 | 0.0224 |
| 13 Y | 0 | 5200 | 4 | 0.0208 |
| 14 Y | 0 | 4400 | 4 | 0.0176 |
| 15 Y | 0 | 3700 | 4 | 0.0148 |
| 16 Y | 0 | 3300 | 4 | 0.0132 |
| 17 Y | 0 | 2900 | 4 | 0.0116 |
| 18 Y | 0 | 2600 | 4 | 0.0104 |
| 19 Y | 0 | 2300 | 4 | 0.0092 |
| 20 Y | 10305 | 1850 | 6 | 0.0111 |
| 21 Y | 0 | 1430 | 6 | 0.0086 |
| 22 Y | 0 | 1270 | 6 | 0.0076 |
| 23 Y | 0 | 930 | 6 | 0.0056 |
| 24 Y | 0 | 870 | 6 | 0.0052 |
| 25 Y | 0 | 845 | 6 | 0.0051 |
| 26 Y | 0 | 820 | 6 | 0.0049 |
| 27 Y | 0 | 790 | 6 | 0.0047 |
| 28 Y | 0 | 760 | 6 | 0.0046 |
| 29 Y | 0 | 740 | 6 | 0.0044 |
| 30 Y | 6045 | 690 | 10 | 0.0069 |
| 31 Y | 0 | 670 | 10 | 0.0067 |
| 32 Y | 0 | 650 | 10 | 0.0065 |
| 33 Y | 0 | 630 | 10 | 0.0063 |
| 34 Y | 0 | 610 | 10 | 0.0061 |
| 35 Y | 0 | 600 | 10 | 0.0060 |
| 36 Y | 0 | 580 | 10 | 0.0058 |
| 37 Y | 0 | 555 | 10 | 0.0055 |
| 38 Y | 0 | 540 | 10 | 0.0054 |
| 39 Y | 0 | 520 | 10 | 0.0052 |
| 40 Y | 4135 | 480 | 15 | 0.0072 |
| 41 Y | 0 | 455 | 15 | 0.0068 |
| 42 Y | 0 | 440 | 15 | 0.0066 |
| 43 Y | 0 | 430 | 15 | 0.0065 |
| 44 Y | 0 | 420 | 15 | 0.0063 |
| 45 Y | 0 | 410 | 15 | 0.0061 |
| 46 Y | 0 | 390 | 15 | 0.0058 |
| 47 Y | 0 | 380 | 15 | 0.0057 |
| 48 Y | 0 | 370 | 15 | 0.0055 |
| 49 Y | 0 | 360 | 15 | 0.0054 |
| TOUCHDOWN | 2998 | 2998 | 75 | 0.2248 |

Figure 16

ON THE 15

| YARDS | PROB. | BREAKOUT | PAY | CONTRIBUTION |
|---|---|---|---|---|
| -2 Y | 0 | 82323 | 0 | 0.000 |
| -1 Y | 0 | 102323 | 0 | 0.000 |
| 0 Y | 631289 | 152190 | 0 | 0.000 |
| 1 Y | 0 | 141830 | 0 | 0.000 |
| 2 Y | 0 | 152623 | 0 | 0.000 |
| 3 Y | 203200 | 121850 | 1 | 0.122 |
| 4 Y | 0 | 81350 | 1 | 0.081 |
| 5 Y | 75178 | 42989 | 2 | 0.086 |
| 6 Y | 0 | 32189 | 2 | 0.064 |
| 7 Y | 0 | 18210 | 3 | 0.055 |
| 8 Y | 42630 | 15210 | 3 | 0.046 |
| 9 Y | 0 | 9210 | 3 | 0.028 |
| 10 Y | 37700 | 8800 | 4 | 0.035 |
| 11 Y | 0 | 7800 | 4 | 0.031 |
| 12 Y | 0 | 7300 | 4 | 0.029 |
| 13 Y | 0 | 7000 | 4 | 0.028 |
| 14 Y | 0 | 6800 | 4 | 0.027 |
| TOUCHDOWN | 10003 | 10003 | 30 | 0.300 |

Figure 17

VIDEO GAMING DEVICE AND METHOD OF WAGERING ON A VIRTUAL FOOTBALL GAME

PRIORITY CLAIM

This patent application is a continuation in part of U.S. patent application Ser. No. 11/804,606, filed May 18, 2007 which claims priority on U.S. patent application Ser. No. 11/234,603, filed Sep. 23, 2005 and U.S. patent application Ser. No. 11/303,208, filed Dec. 17, 2005 which are both continuations-in-part of application Ser. No. 10/675,500, filed Sep. 30, 2003 and provisional application Ser. No. 60/678,984, filed May 9, 2005.

FIELD OF THE INVENTION

A video gaming device and method for wagering on a virtual football game that is referred to as the "2-Minute Warning Game," comprising a video touch screen and a plurality of selector control keys to selectively generate play selections and wagering selections. This invention is a wagering game as well as a football simulation game, in which the player is awarded based on how far the team progresses down the field after selected offensive running and passing formations and a "movie" is viewed of the play selected. The invention presents a game in a 3D format with offensive football plays in a "two minute drill" style.

BACKGROUND OF THE INVENTION

Video gaming machines for wagering have been widely adopted by the gaming world as the successor to the traditional, reel-based, mechanical slot machine. The term "gaming", as used herein, indicates that some form of wagering is occurring in the form of currency or an equivalent, e.g., tokens or credits.

The most basic purpose of a gaming apparatus is to display a randomly generated result and its associated payout. Currently, video gaming systems vary greatly in the way they generate the actual representation of a game and its associated results. At any given time, casinos can host hundreds of different games with equally varied features. However, traditionally, the randomly generated results cannot capture the actual "feel" of a game representation.

There is a need for engaging and entertaining games that create a competitive interactive play between the player and gaming machine holds the player's interest and more closely simulates the play of an actual game. The present invention is such a video gaming device and method for wagering on a football simulation game, where the player is awarded for moving the team down the field after the player selects various offensive running and passing formations and after a "movie" is viewed of the play selected. Further, the game play changes based upon the location on the field to more accurately capture the actual "momentum" of the game.

U.S. Pat. No. 6,135,885 describes a method for the player to play a wagering sports game such as football. The player makes a wager and defensive and offensive formations are selected and displayed. The play is run and based upon the outcome obtained, the player either wins or loses the wager.

U.S. Pat. No. 6,319,123 describes a method of playing a game including a plurality of events depicted in a series of sequential, non-identical images identified as a first image, a second image and so forth. A first image selected from the plurality of first images is displayed in a frame on a video monitor. Likewise, a selected one of the second images from the plurality of second images is displayed in a second frame. If the images displayed in the frames sequentially depict the first and second images of the event, a winning condition is achieved. An apparatus for performing the method is disclosed.

U.S. Pat. No. 6,375,568 describes to an interactive gaming process and system, comprising a plurality of gaming machines to be played by a plurality of players. Each gaming machine comprises a wagering game and a theme game. The wagering game has features that correspond to the theme game wherein the results of the wagering game influence the results of the theme game as the wagering game is being played. The system includes a controller for electronically linking the gaming machines and providing stimuli to the gaming machines to effect gaming machine outputs that are impartial and random. In one embodiment, the plurality of players play the wagering game as a group wherein if one player's theme game results meet predetermined criteria, the particular player will play for the group, which will split any jackpot. In another embodiment, the plurality of players play as a group wherein activation of each player's wagering game either helps or hinders the group as a whole in its effort to achieve a predetermined goal. In another embodiment, the players play their respective wagering game directly competing against each other in the theme game. The results of the wagering games determine the winnings of each player, the eventual winner of the theme game and/or any predetermined jackpot.

U.S. Pat. No. 6,077,163 describes a method and apparatus for operating a gaming device having a flat rate play session costing a flat rate price spanning multiple plays on the gaming device over a pre-established duration. The gaming device identifies price parameters and determines the flat rate price of playing the gaming device.

U.S. Patent Publication 2001/0046893 describes a game of chance, involving a progression of events conducted on one or more gaming machines. After receiving a wager from a player at a gaming machine, play of the game is initiated. To continue play of the game beginning from a point at which the game was paused, the personal identifier is provided to the central database via the same or another gaming machine and the game status associated with the personal identifier is retrieved from the central database.

U.S. Patent Publication 2002/0132660 A1 describes a method for wagering on a gaming device where players purchase time on the device as opposed to an individual game where players are allowed to play as many individual games as possible to maximize their returns.

U.S. Patent Publication 2003/0060255 describes a gaming device having a processor and a display device connected to the processor. The display device displays a plurality of choices to a player, whereby each choice has an associated number of points. The processor provides an initial number of picks to the player. The processor also maintains a regeneration amount, whereby the player receives a new number of picks, if the points associated with the player's choices accumulate at least to the regeneration amount, within the provided number of picks. In one embodiment, accumulating points includes accumulating awards. If the player accumulates a predetermined goal amount of points, the player also wins a goal award.

U.S. Patent Publication 2003/0060277 describes an apparatus and method for operating a gaming device that enables a player to obtain an award based upon the number of goals the player is able to achieve during game play. The goals advance in difficulty as the player achieves each goal. The game terminates automatically when the player fails to achieve a goal.

U.S. Patent Publication 2003/0119578 describes a gaming machine and a method of operating such a gaming machine, comprising a video screen adapted to display a game of chance involving game events having random outcomes including winning outcomes and losing outcomes; and means adapted to display a range of video clips, each video clip being designated as either a winning video clip or a losing video clip; wherein the machine displays one of the winning video clips in response to one of the winning outcomes of a game event, and displays one of the losing video clips in response to one of the losing outcome of a game event.

U.S. Patent Publication 2006/0094490 describes a video gaming device and method of wagering on a virtual round of golf or golf game comprising a video touch screen or display and a selector control panel including a plurality of selector control keys to selectively generate a plurality of golf stroke selections and control signals including golf stroke selection signals and wagering selection signals, and a microprocessor including game data comprising a plurality of wager selections and a plurality of club selections corresponding to the golf stroke selection signals and wagering selection signals and a predetermined game situation profile; a data processing section including logic to receive the golf stroke selection signal and control signals from the plurality of selector control keys to generate display signals in response to the club selection and control signals to be displayed on the video screen or display in response to operator input from the plurality of selector control keys and to generate a golf game play image on the video screen or display as the golf stroke executed against the predetermined golf game situation profile and display the wagering results.

Despite these efforts, there is a need for new entertaining interactive gaming devices to maintain players' interest level in wagering on gaming machines.

SUMMARY OF THE INVENTION

These objectives are achieved by providing a gaming machine for wagering on a virtual football game comprising: an input panel for receiving a player's selection information; a processor in electronic communication with said input panel and a computer readable medium; a display in communication with said processor for displaying a current position and a game clock; a set of predefined plays embodied in said computer readable medium representing offensive running and passing plays; a set of kickoff return results embodied in said computer readable medium representing kickoff return yardage from a kickoff return; a deep, mid and near zone defined by predetermined distances from the goal line; a deep zone set of play advancement information embodied in said computer readable medium representing the probability of advancing a predetermined distance toward said goal line when a current position is in said deep zone; a mid zone set of play advancement information embodied in said computer readable medium representing the probability of advancing a predetermined distance toward said goal line when said current position is in said mid zone; a near zone set of play advancement information embodied in said computer readable medium representing the probability of advancing a predetermined distance toward said goal line when said current position is in said near zone; and, a set of computer readable instructions that, when executed by said processor, perform the steps of establishing a game clock having a predetermined period of time representing the amount of time remaining to play, displaying said game clock through said display, receiving said player's selection information representing a kickoff reception request through said input panel representing that the player wishes to receive a kickoff, calculating a current field position according to said set of kickoff return results if a touchdown is not achieved, (a) receiving said player's selection information representing an offensive play request from said input panel representing the players play selection from said set of predefined plays, (b) updating said current field position according to said set deep zone set of play advancement information if said current position is in said deep zone or according to said mid zone set of play advancement information if said current position is in said mid zone or according to said near zone set of play advancement information is said current position is in said near zone and said game clock is not expired and said goal line has not been reached, repeating steps (a) and (b) until a touchdown is achieved or said game clock expires or a first down is not achieved after four tries and displaying a virtual football game for the player.

The set of deep zone, mid zone and near zone probabilities are lower if said game status is a second, third or fourth down. The gaming machine can include instructions for determining if said current position is in a red zone and increasing a player account value stored on said computer readable medium if said current position is in said red zone. The player account can be increased according to an increasing bonus scale according to said current field position wherein said bonus scale includes increasing bonus awards in relation to greater distances from the current position to said red zone.

The gaming machine can include instructions for determining a first down field position, determining if, according to said current field position and said first down field position, a first down is achieved and increasing a player account value stored on said computer readable medium if said first down is achieved. The gaming machine of claim 1 can including discrete position probability information representing the probability of advancing from a discrete yard in a range of yards from the discrete position to said goal line and for each yard in said range and a contribution calculated from a breakout and pay value representing the pay associated with advancing from said yard line.

An award can be calculated by multiplying a player's initial wager with said contribution. The award to the player can be also calculated by multiplying a player's initial bet with the sum of all of said contributions from each of said play advances. The gaming machine's computer readable instructions can include instructions for increasing a player account value if said play advancement reaches said goal line.

BRIEF DESCRIPTION OF THE DRAWINGS

The following description of the invention can be better understood by referring to the drawings described below and made part of this specification:

FIGS. 5A through 11 are tables describing the present invention;

FIG. 12 are tables representing payout for one embodiment of the present invention;

FIGS. 14A through 17 are probabilities for one embodiment of the present invention.

DETAILED DESCRIPTION OF THE INVENTION

Figure 1:
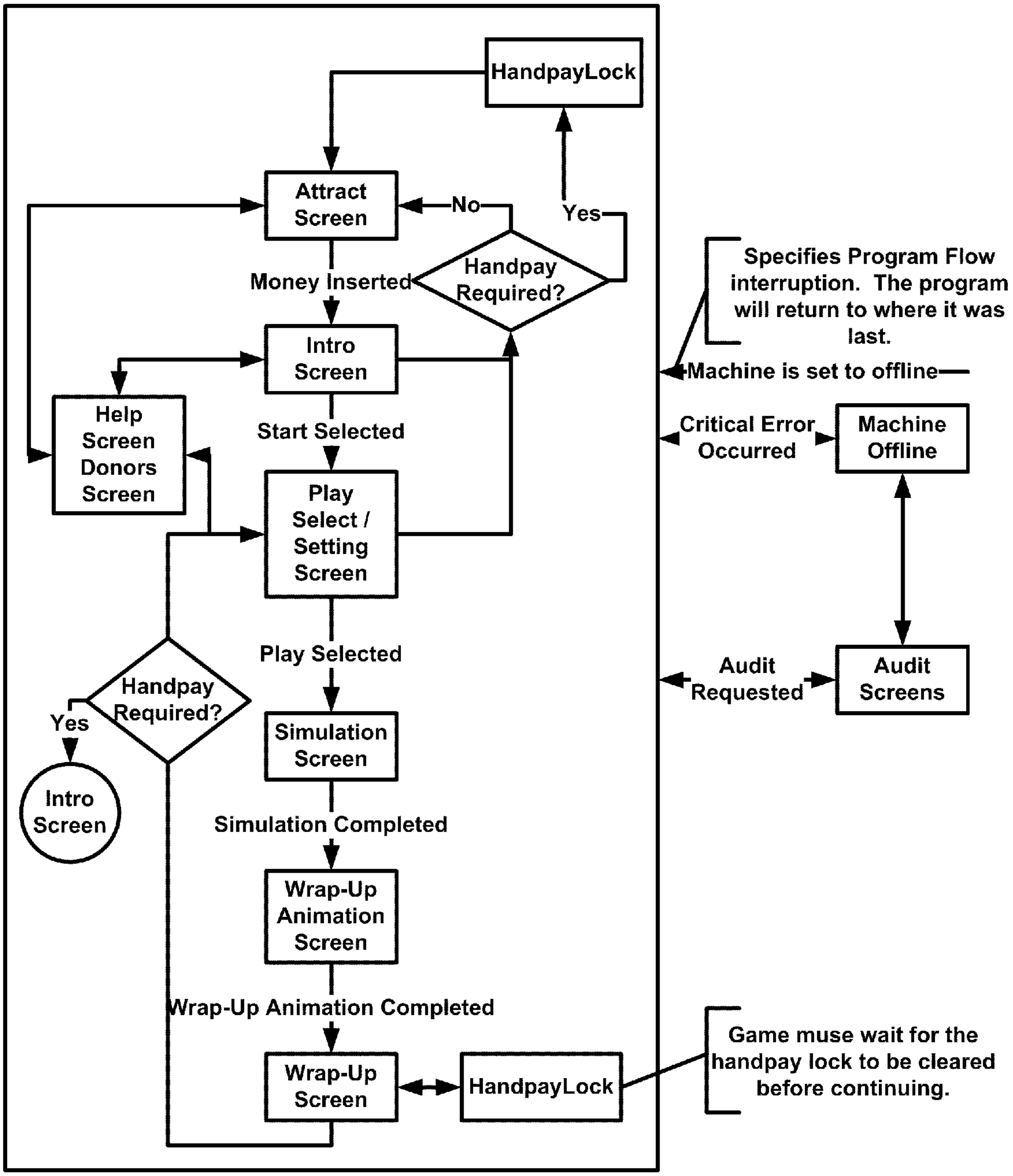
FIG. 1 is a flowchart of the invention.

Computer readable instructions are computer readable code embodied in a computer readable medium that when executed cause a computer to perform a series of steps to accomplish a specific task detailed in this invention. These computer readable instructions are tied to a particular machine for executing the computer readable instructions to achieve a discrete result. The detailed description that follows may be presented in terms of software procedures executed on a computer or network of computers. These procedural descriptions are representations used by those skilled in the art to most effectively convey the substance of their work to others skilled in the art. These procedures herein described are generally a self-consistent sequence of steps leading to a desired result when executed by a computer and its processor. These steps require physical manipulations of physical quantities such as electrical or magnetic physical elements and are capable of being stored, transferred, combined, compared, or otherwise manipulated readable medium that is designed to perform a specific task or tasks. Actual computer or executable instruction or computer readable instruction may not be contained within one file or one storage medium, but may span several computers, mediums or computer readable mediums. The term "server" may be hardware, software, or combination of hardware and software that provides the functionality described herein.

The present invention is described below with reference to flowchart illustrations of methods, apparatus ("systems") and computer program products according to the invention. It will be understood that each block of a flowchart illustration can be implemented by a set of computer readable instructions. These computer readable instructions may be loaded onto a general-purpose computer to convert it into a special purpose computer, a special purpose computer, or other programmable data processing apparatus to produce a machine such that the instructions will execute on a computer or other data processing apparatus to create a means for implementing the functions specified in the flowchart block or blocks.

These computer readable instructions may also be stored in a computer readable medium that can direct a computer or other programmable data processing apparatus to function in a particular manner, such that the instructions stored in a computer readable medium produce an article of manufacture including instruction means that implement the functions specified in the flowchart block or blocks. Computer program instructions may also be loaded onto a computer or other programmable apparatus to produce a computer executed process such that the instructions are executed on the computer or other programmable apparatus provide steps for implementing the functions specified in the flowchart block or blocks. Accordingly, elements of the flowchart support combinations of means for performing the special functions, combination of steps for performing the specified functions and program instruction means for performing the specified functions. It will be understood that each block of the flowchart illustrations can be implemented by special purpose hardware based computer systems that perform the specified functions, or steps, or combinations of special purpose hardware or computer instructions.

The present invention is now described more fully herein with reference to the drawings in which the preferred embodiment of the invention is shown. This invention may, however, be embodied in many different forms and should not be construed as limited to the embodiment set forth herein. Rather, these embodiments are provided so that this disclosure will be thorough and complete and will fully convey the scope of the invention to those skilled in the art.

In the following detailed description of sample embodiments of the invention, reference is made to the accompanying figures that form a part hereof, and that is shown by way of illustration specific sample embodiments, in which the invention may be practiced. These embodiments are described in sufficient detail to enable those skilled in the art to practice the invention, and it is to be understood that other embodiments may be utilized and that logical, mechanical, electrical and other changes may be made without departing from the spirit or scope of the present invention. It is essential to an appreciation of the practice of the present invention that the jurisdictional approval requirements and the industry standards of the gaming industry be considered in determination of the skill and technical sophistication of the present technology and invention.

The present invention relates to a video gaming device and method for wagering on a virtual football game. The video gaming device comprises a game cabinet and base to operatively support a video screen and a selector control panel and a wager/payout mechanism and to house a processor. The housing can contain a computer readable medium for storing computer readable instructions that, when executed by the processor, provide the game play and functionality described herein.

FIG. 1 illustrates the overview of the program flow with the game divided into the following game play screens: the Attract Screen, Intro Screen, Betting Screen, Help Screen, Play Selection Screen, Simulation Screen, Wrap-up Animation Screen and Wrap-up Screen.

The game has four modes of operation: play, demo, test and audit. The play mode is the mode when the game is in operation. This mode is where a player inserts money and plays the game. Demo mode allows for the demonstration of the game without impacting meters or other information on the game. The test mode combined with the demo mode allows testing of the game portion of the engine. All metering for the Game is displayed in the audit screens.

A Play represents a single offensive formation. The first play in a drive is the kickoff return and its pay is divided into the following pay ranges: (1) 0-29 yards [no payout], (2) 30-39 yards, (3) 40-49 yards, (4) 50-59 yards, (5) 60-69 yards, (6) 70-79 yards, (7) 80-89 yards, (8) 90-99 yards.

For plays from scrimmage other than the kickoff return, the following yard ranges are used: (1) minus 10-plus 3 yards [no payout], (2) 4-14 yards [2 to 1 payout], (3) 15-29 yards, (4) 30-44 yards, (5) 45-59 yards, (6) 60-74 yards, (7) 75-89 yards, (8) 90-99 yards [1,000 to 1 payout]. The bonus for a touchdown is a multiplier on the current bet. The first down bonus is a multiplier based on the number of first downs previously gained and this multiplier increases exponentially. As an alternative, touchdown and first down bonuses can be flat credit amounts independent of the current bet.

As shown in FIG. 1, the Attract Screen is an animation sequence/loop that shows the game in action without the player being involved. It cycles between sample plays yet be different enough that players know that the game is in Attract mode. From this screen the player is able to insert money, view the help screens and change the game denomination (if enabled). When a player inserts money, he is immediately taken to the Intro Screen. There is a 15-30 second delay from the time a player cashes out until the attract animation sequence begins.

As shown in FIG. 1, the Intro Screen is an intermediate screen that occurs after the insertion of money, but before the start of a drive. On this screen, the player has the option to view the Help Screen, cashout, insert money, change the game denomination (if enabled) or start the drive. Once the player chooses to start the drive, a brief animation plays signifying the start of the game and the game clock starts.

As shown in FIG. 1, the Help Screen describes the paytable and the rules of the game and it describes all payout ranges and associated payouts as well as all possible bonus awards.

As shown in FIG. 1, from the Start Screen the player is allowed to cashout, insert money, change the denomination, and select a bet, which changes to the Betting Screen. The Betting Screen shows each bet amount as a separate button, and includes buttons for max bet, and to repeat the previous bet. Once a bet is selected the Betting Screen immediately moves to the Play Select Screen 01.

Figure 2A:
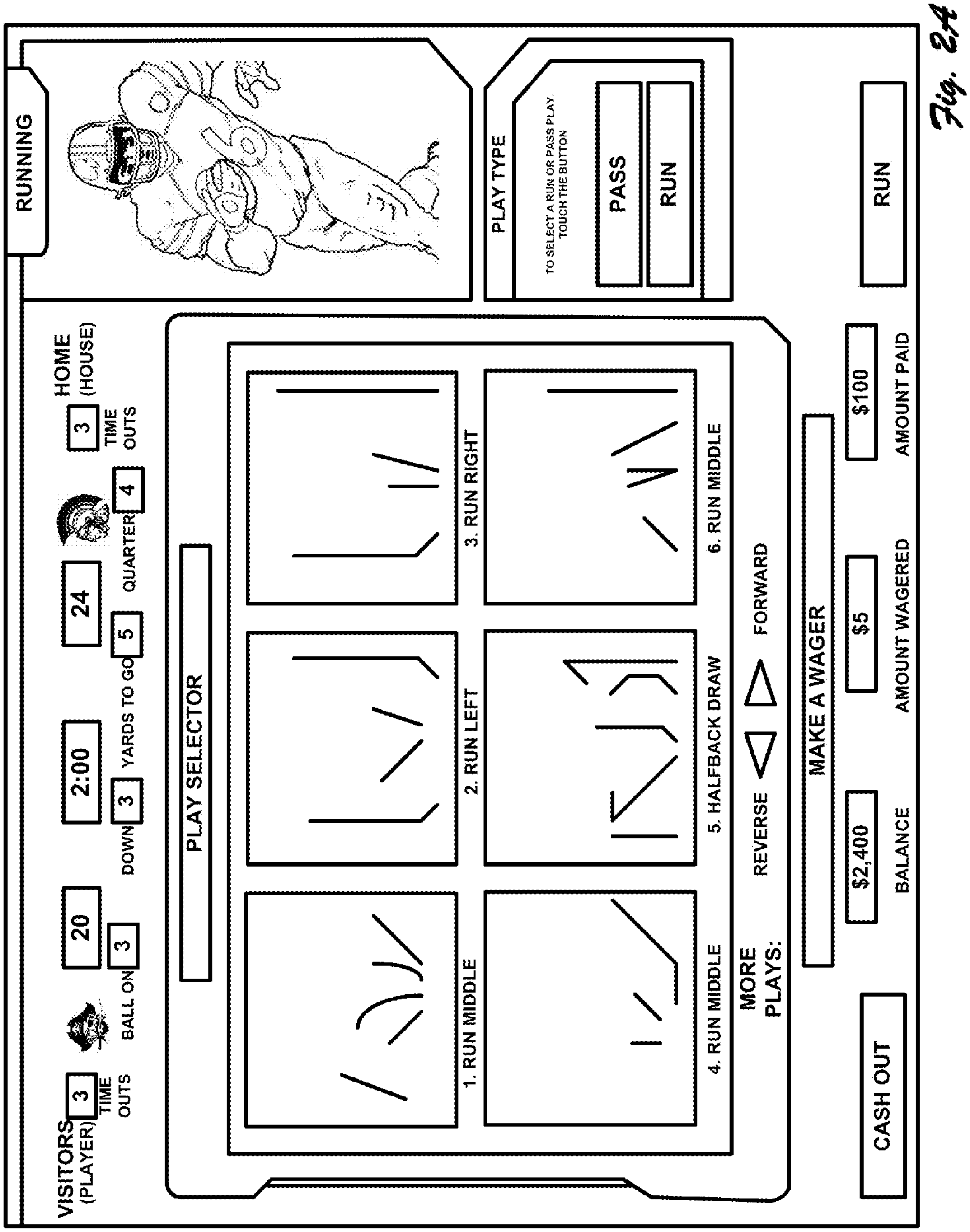
FIGS. 2A through 2D are images of displays produced by the present invention.
Figure 2B:
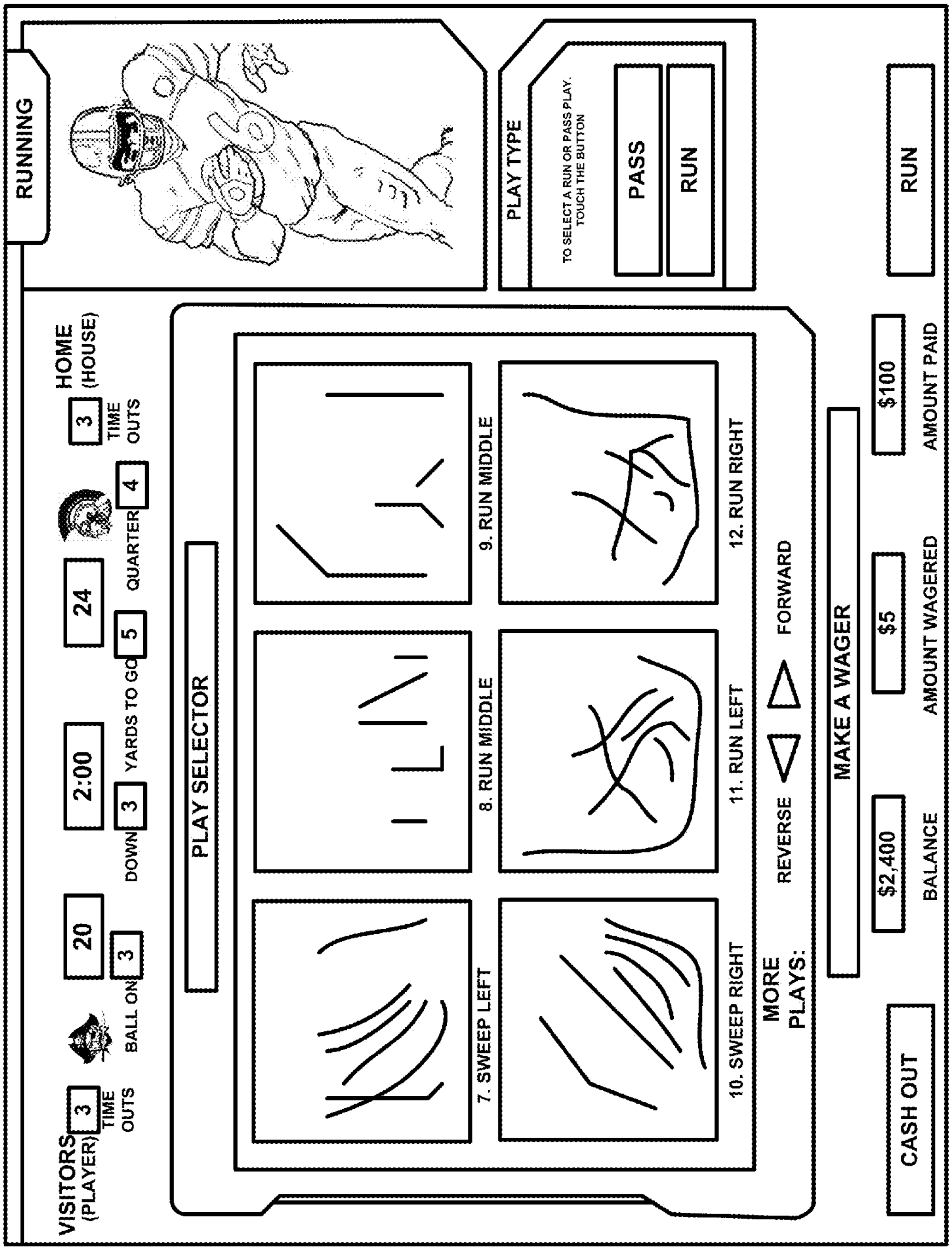
Figure 2C:
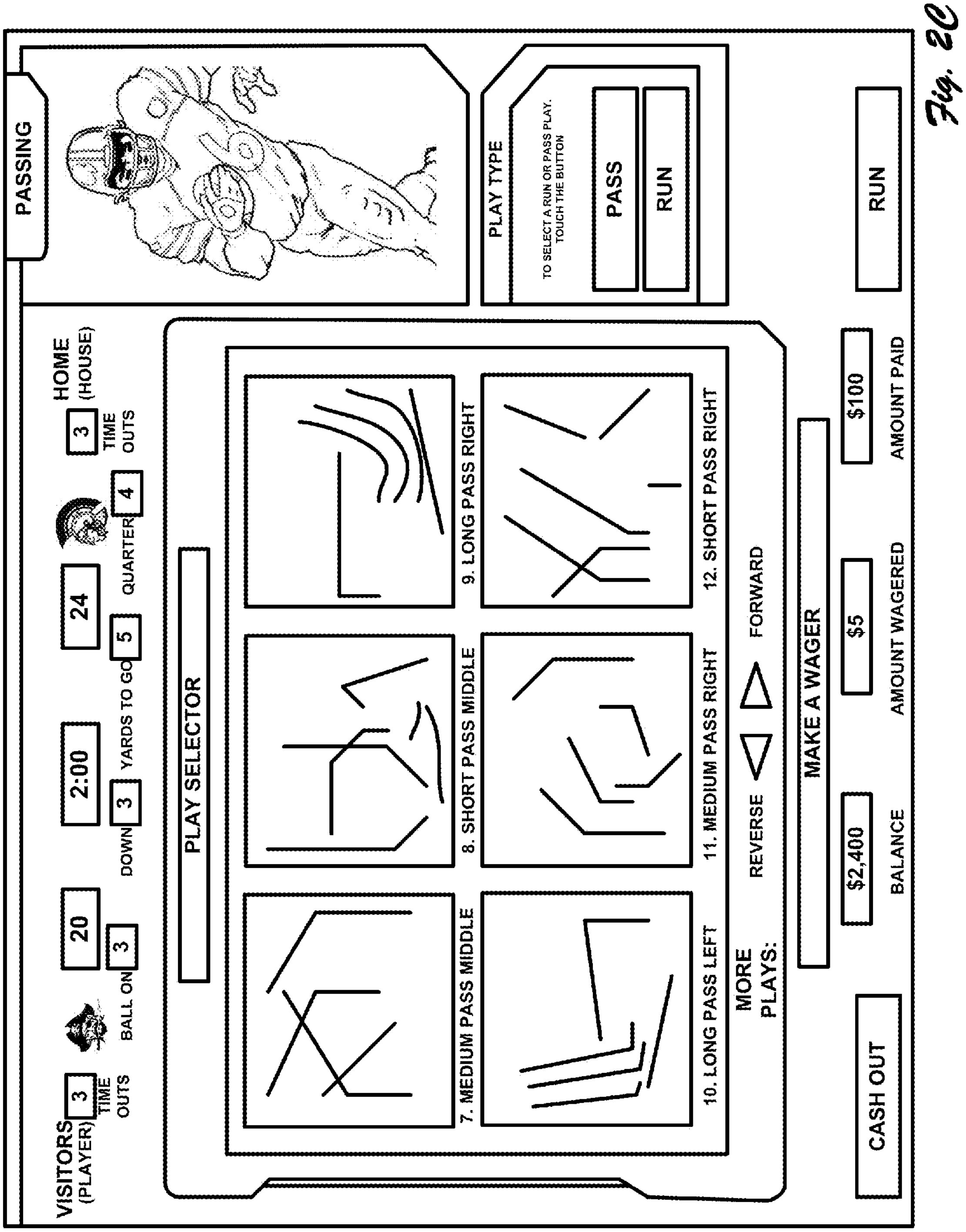
Figure 2D:
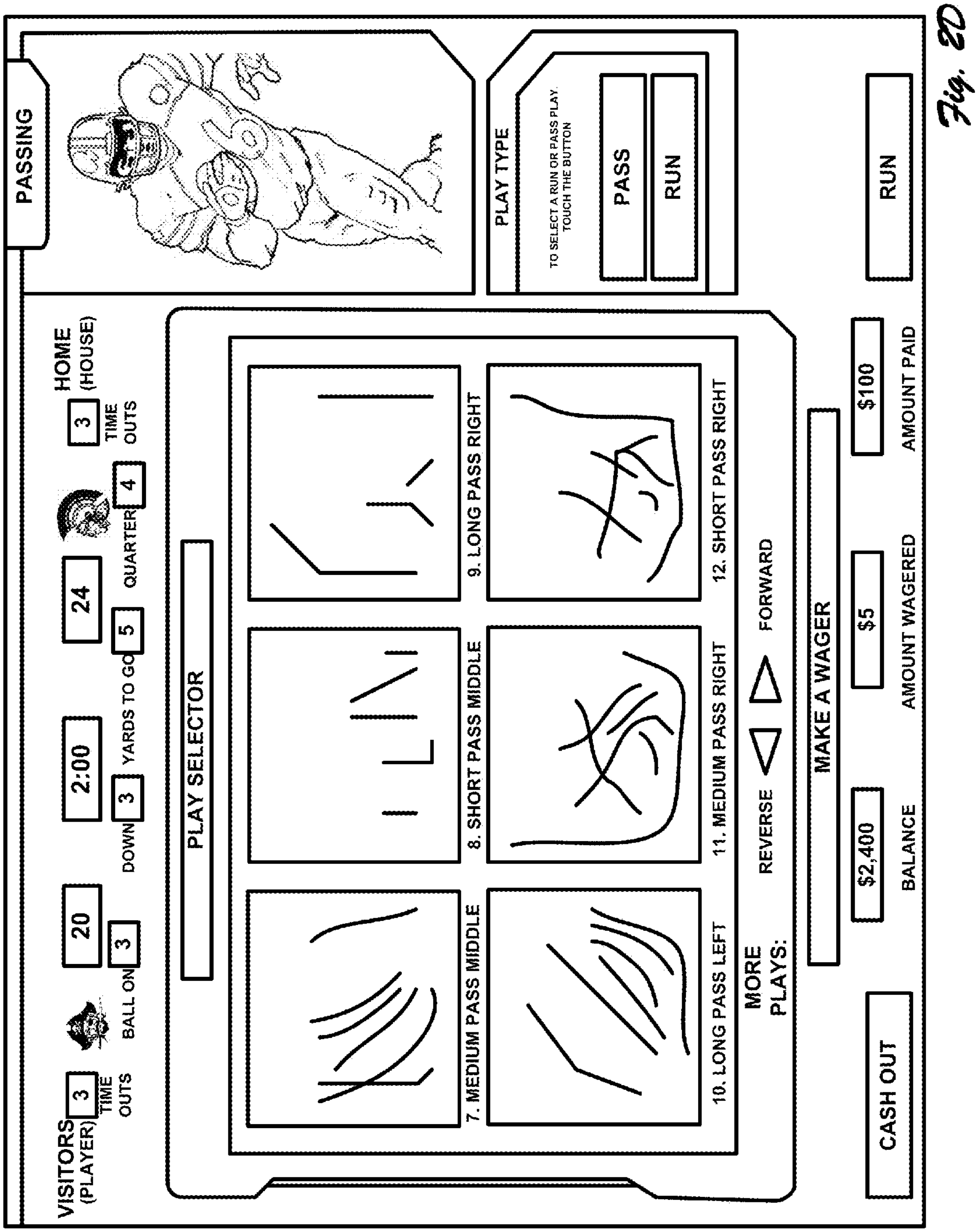
Figure 3:
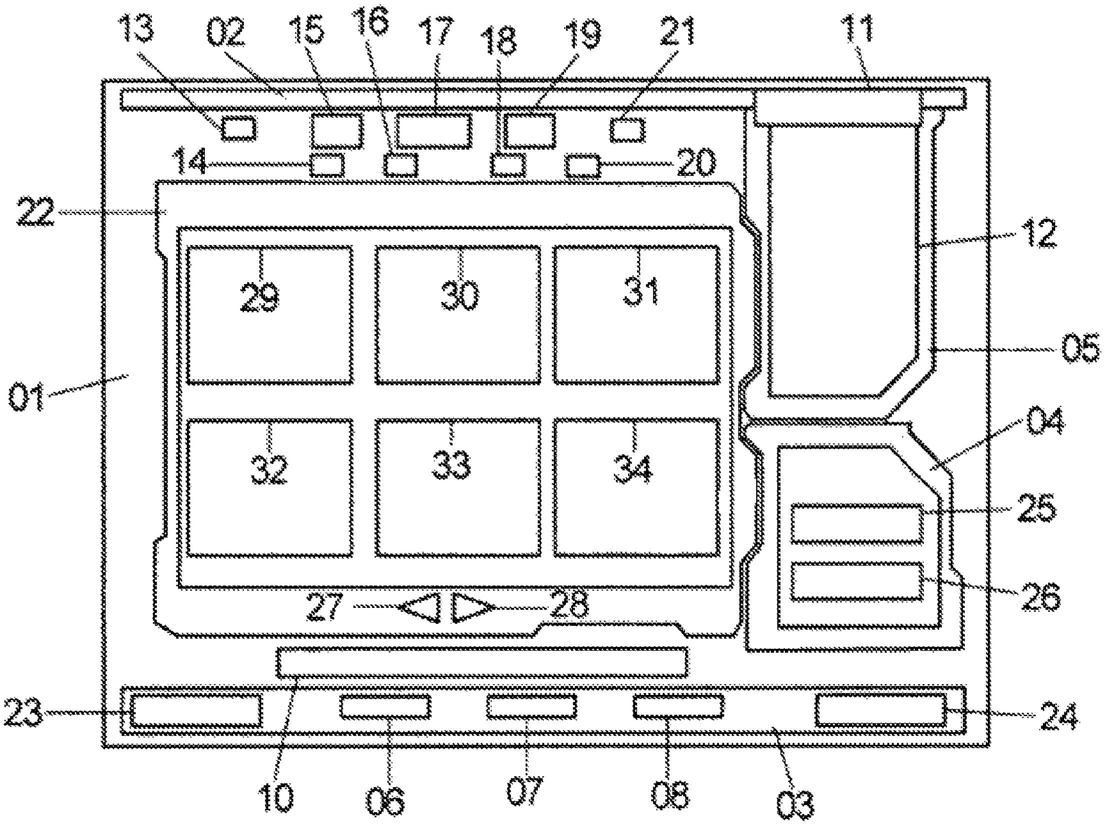
FIG. 3 is a schematic of components of the present invention including the input panel.

As shown in FIGS. 1 and 3, after the player places a bet the Betting Screen changes to the Play Select Screen 01. This screen allows the player to select a play in the Play Type Select Window 4 from a list of 12 passing plays 25 by pressing the Go to Next Page of Plays 28 or Go to Previous Page of Plays 27 and 12 running plays 26 for a total of 24 Play Depiction/Play Select Buttons 29 through 34, but only 6 plays are visible at one time on the Play Selector Frame 22, see FIGS. 2A, 2B, 2C and 2D for the pass and run play selection choices, which randomly change. Each individual play consists of multiple variations. An Information Bar 10 is provided to assist the player. The Play Mode Display Window 5 illustrates the Play Mode Graphic 12 and the type of play selected is illustrated by the Play Mode Indicator 11. The player is allowed to return to the Betting Screen, view the Help Screen, or cashout by pressing a hardware cashout button. Once a play is chosen, the game switches to the Simulation Screen (Active Play "movie" Screen) 36.

Figure 4:
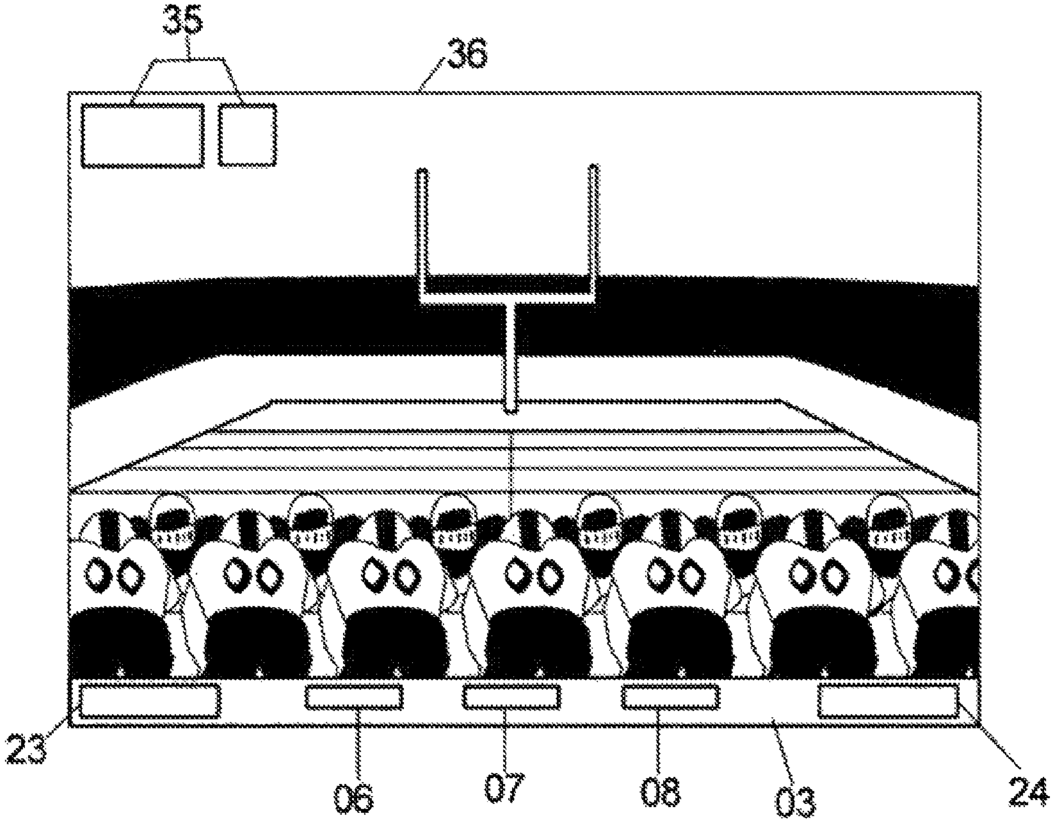
FIG. 4 is a image of the display produced by the present invention.

As shown in FIGS. 1 and 4, the Simulation Screen 36 simulates the chosen play and its outcome. By watching the play, the player sees how many yards are gained. The Simulation Screen tracts the Time Remaining 17, Time Outs Visitor 13, Ball On 14, Visitor Score 15, Home Score 19, Down 16, Yards To Go 18, Quarter 20, Time Outs Home 21 and Heads UP Display 35. When the simulation is completed, the Wrap-Up Animation Screen is displayed.

As shown in FIG. 1, the Wrap-Up Animation Screen shows any post-play animations. This Screen includes random celebrations/disappointments based on the outcome of the play. These celebrations/disappointments may take the form of a player dance, fireworks display, coach animations and comments, or some other suitable "movie" scenes. The Wrap-Up Screen shows the result of the previously run play. It includes yards gained, credits awarded for yardage, first down bonus (if any), touchdown bonus (if any), and total credits won. This screen shows information related to the completion of a drive. The completion of a drive occurs for one of three reasons, either the player has made a touchdown, the player was unable to get a first down in 4 plays, or the player ran out of time. The drive Wrap-Up screen displays to a player one of these reasons before returning to the Intro Screen. This Screen notifies the player, if his credit amount has reached 0 and he needs to insert more credits to continue the current drive. The player is required to insert money within a specific amount of time before the game drive ends. The game clock 17 is paused during this time.

Each of the Screens described above have options for player interactions. For the Betting Screen, the bet buttons allows the player to change the current bet. The Max Bet button allows the player to change the current amount to the maximum allowed bet. The Repeat Bet button changes the current amount the player is betting to the amount the player bet in the previous game. The buttons that change the current bet are only accessible during the Betting Screen.

In the Play Select Screen 01, the player selects the next play desired. The simulation shown on the following Simulation Screen 36 shows the selected play in action, "movie" scenes.

The Help button 24 allows the player to view the Help Screen and related game information.

The game machine stores a list of names and assets for additional player uniforms and logos on the game media. The names, uniforms, and logos can be changed to a new set of these through the setup section of the audit screens without requiring a code change or recompile. As shown in FIG. 3, the Play Selection Screen 01 is a touch screen view of the game and has a top graphic frame 02 and a bottom graphic frame 03 that includes the machine information of Cashout 23, Bet 07, Balance 06, Paid 08 and Help 24.

The Game Engine presents the game in a 3D format with only offensive football plays in a 'two minute drill' style. The player selects from 24 random offensive plays and the game ends after four downs. The outcome is determined, after the player selects the play, by the number of yards his team completes. After the play, a secondary scene may be played. If successful, a Celebration Scene is selected and vice-versa for failure. A Celebration Scene for example might include a shot of the cheerleaders and the players congratulating each other.

The game is implemented using a custom "mini" 3D-Engine and the Game Engine is written using OpenGL and run at 60 Hz. FIGS. 5A and 5B illustrate the components that make up the Game Engine.

As shown in FIG. 5A, a simple static model renderer is supported. Sub-transforms are not required as there are no models with moving or rotating pieces. Any sub-transforms are baked at export time, so each model consists of a single local transform. Sub-models are useful for culling, so anything below a local transform is preserved, A separate variant of the model renderer is used for skinned characters to accommodate scaling etc. and to allow separate optimization of animation rendering.

As shown in FIG. 5A, the animation system is simplified in that the system has a constant frame rate and 'known' transitions. With a constant frame rate, the system can forgo tweening and speed scaled interpolation. The system supports blending, although only 'all channel' blending is required and only 2-way blending, as the system never blends between more than two animations. The animation system uses standard forward kinematics, (unlimited chain length), to pose a limited number of skeleton key-frames. As the system has a fixed frame rate, (and so animation playback speed), interpolated animation curves are easier to construct. Once the pose buffer has been filled for a particular frame, the skeleton is skinned. The system supports scaling per character to add some variation to players using the same animation, (independent all-axis). As scaling is not required by the static model renderer, the animation system uses its own renderer, which also allows the system to optimize characters separately, (character models may not support the full set of material effects for example, or restrict the number of dynamic light sources). Individual animation frames may also be tagged with events that carry through the exporter into the run-time engine. Tags can be added for any additional cues/triggers required by the game that are tied to animation, (for example, dirt flying from a characters feet or sound cues). Tags may carry commentary cues.

As shown in FIG. 5A for Material Effects, Material (surface) effects is implemented using shaders. The platform graphics hardware supports the shader 3.0 specification, so any and all current pixel shader effects are used. The system supports traditional material effects, such as environment mapping, (at least for the sky on liquid surfaces); stadium lights on top of helmets and so on. Vertex shaders are not required by the static rendering system, but may be used by the animation system.

As shown in FIG. 5A for Lighting, the animation system supports a fixed number of lights per character. The system has bake lights into the static stadium geometry and incidental models; lights are applied to dynamic elements. Shadows are supported when they are modeled with the character and exported from Max. Characters do not self shadow. Simple point lights are supported with radius, fall off and material characteristics, (dependant on the type of material effects required by art), along with directional, (ambient), lights. As lights are baked on static geometry any number of directional and point lights may be used. Only directional lights are baked on animating models, (prior to a play beginning).

As shown in FIG. 5A for the Crowd Renderer, the Crowds in the stands have animating textures and automatically generated/placed strips. The cookie-cut alpha strips are drawn with animating textures representing the crowd. Some degree of control over animation speed is possible allowing crowd excitement. Crowd strips are affected by directional lights, but not point lights.

As shown in FIG. 5A for the Particle Effects Renderer, simple particle effects are supported with limited faked physics. Only a few particle effects are required such as flying grass/dirt, lens flare, etc. Alpha flats only are supported without point light support. Particles support simple gravity physics and local rotation/texture animation.

As shown in FIG. 5A for the Incidental Character System, the game renders a number of fake sideline characters with limited animation standing on the side lines, such as camera crews, reserve players, cheer leaders, etc.

As shown in FIG. 5A for the Dynamic Camera, the camera is an important character in the game with complete unhindered movement of the camera around the scene. Camera movement carries through the pipeline and the camera moves dynamically with the scene in the same way as an animating character. Lens flare and any other ambient effects are applied automatically. Like the animation system, the camera system is simplified, running at a constant frame rate. No interpolation between movement 'frames' is required, or speed scaling due to uneven frame rate.

As shown in FIG. 5B for the Viewpoint System, the design documents present plays as separate scenes at multiple yard lines; in effect however, only the yard line, (position on the pitch), changes and not the scene itself. To maximize art resources scenes consist of moving and animating components only, (players, camera, ball, particles etc.). The stadium, incidental geometry and lighting are managed and rendered separately and 'moved' to the origin of the scene according to the current yard line. The engine supports global offsets on transforms which are baked once at the start of a play to the correct yard line offset. The animating/moving components stay where they are and always are offset at origin. The field cam follows the length, (or breadth), of the field and not the action. Cameras tied to the field then correctly follow the offset stadium and not the localized scene and vice-versa for moving objects.

As shown in FIG. 5B for the Scene Management, the system has regular frustum culling performed separately for animating characters and static geometry.

As shown in FIG. 5B for the 2D Support, the game is presented in "TV Broadcast" style; that means HUD displays showing channel style logos, player names, scores and so forth.

As shown in FIG. 5B for the Debugging Font Support, the engine supports a simple text system for debugging display and on-screen information that is not seen, but supports on-screen display of error messages, (loading errors, missing assets, etc.).

For the Audio Support, the game requires two forms of audio; static audio for spot FX and streaming audio for commentary. For both types of audio, the system uses the Microsoft DirectSound, (DirectShow), API. XPe supports DirectSound (DirectShow) extensions. Crowd effects use the SFX system, with the addition of pitching and cross fading for excitement/emotion, etc.

The Autodesk's FBX file format is a 3D asset specification, in which the FBX format supports everything needed for TMW including: Mesh geometry, Skinned Geometry, Animation, Lighting, Animation/movement paths and Material & Shader effects.

FIGS. 6A and 6B detail all exportable assets that are supported by the MAX 8.0 Motion Mixer. The Motion Mixer works as an animation controller or audio sequencer, but for an entire scene.

FIG. 7 details the tools and file formats used by the build pipeline. All tools are based on the same base executable that will include general support such as file processing for single or multiple files, conversions, command line switch processing, error reporting and XML parsing. Tools support dependency checking, so assets are recompiled only when they change.

FIG. 8 is a breakdown of the art in the major 2D In-Game asset and presentation.

FIGS. 9A and 9B illustrate the character modeling asset types and descriptions.

FIG. 10 illustrates the Stadium asset modeling and details.

FIG. 11 illustrates the animation and rigging assets and details.

FIG. 12 details the payout tables for the simulated game by providing probability and payout for the plays, statistics and kickoff. The player selects a play from the betting screen of 12 running and 12 passing plays see FIGS. 2A, 2B, 2C, and 2D. Each individual play consists of multiple variations. Each variation is separate and unique and results in a finite set of scenes. A scene is an individual "movie" that the player views after he selects his play. The scene by definition is a predetermined outcome.

Figure 13:
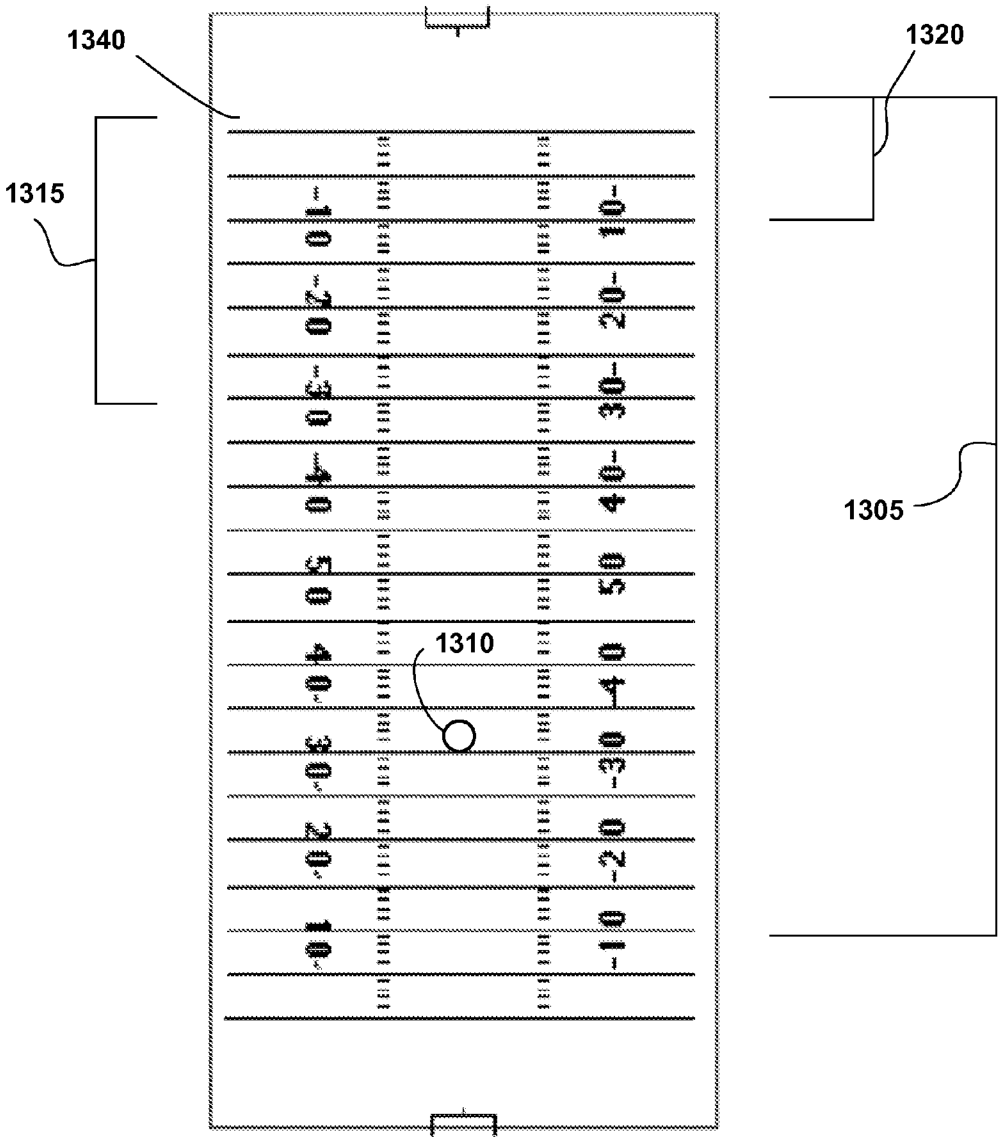
FIG. 13 is a schematic of the present invention.

In one embodiment, the operations of the game provide for a unique playing experience to the user as shown in FIG. 13. Computer readable instructions provide for information to a processor that, when executing the computer readable instructions, cause a display to show a game clock with a predetermined period of time remaining in the game as shown in FIG. 2A. In the embodiment shown in FIG. 2A, the game clock has the predetermined time remaining of two minutes. Offensive plays are displayed to the user as shown in FIG. 2A representing predefined plays embodied in the computer readable medium in communications with the processor.

In operation, the user enters selection information through the input panel, touch screen, buttons or other input means, representing the user desire to begin the game and receive a kickoff. The computer readable instructions then calculate a current field position, 1310 of FIG. 13 resulting from the kickoff and a virtual kickoff return. In one embodiment, the kickoff return yardage is based upon a decreasing probability for increased yards gained. For example, FIG. 14A illustrates one formulation for decreasing probabilities for increased kickoff return yards.

Once current field position is calculated, the user enters selection information representing the offensive play selected by the user. The computer readable instructions receive the selection information and update the current field position according to either a first or second set of play advancement information.

In one embodiment, the virtual playing field is segmented into three sections: far zone 1310, middle zone 1315 and near zone 1320. The probabilities of reaching the goal line from within each zone differ. For example, in the deep zone, the probabilities of advancing 8 yards is 0.027, 5 yards is 0.0334 and of reaching the goal line is 0.00073. From the middle zone, the probabilities of advancing 8 yards is 0.03663, 5 yards is 0.05778, and of reaching the goal line is 0.001477. From the near zone, the probabilities of advancing 8 yards is 0.070376, 5 yards is 0.076776 and of reaching the goal line is 0.0.017688. These differing probabilities provide for a more realistic game play by mimicking real life occurrences. For example, when the player is within ten yards of the goal line, there becomes a higher probability of advancing the remaining ten yards to a touchdown. This, according to some analysts, is an effect of increased concentration of players near the end zone, higher effort and "last chance" mentality. Nevertheless, this invention captures the real work observed occurrences associated with the current field position and the probabilities of advancement toward the goal line 1340.

In one embodiment, the probabilities of advancement are also dependent upon whether the offense is operating with a first down or a second, third or fourth down. For example, if the game status is first down and the current field position is in the deep zone, the probabilities of advancing 8 yards is 0.027 and from 5 yards is 0.0274. Therefore, there is a decreased change of advancing if the game status is at first down as opposed to second, third or fourth down.

In one embodiment, a red zone is defined on the virtual playing field. Traditionally, the red zone is considered 20 yards out from the goal line. In the event that the user can advance the current field position into the red zone, the user can be rewarded with an increase in the user player account representing winnings for reaching the red zone. Additionally, the user can be rewarded with an increase in the user player account if the player advances sufficient yards, generally 10, to achieve a first down, representing winnings for reaching a first down.

In one embodiment, the determination of the probability is determined for discrete virtual yardage positions. For example, in the mid zone and if the current position is on the 30 yards out from the goal line, the probability of advancing 6 or 7 can be set to 0 while the probability of 8 yards is 0.0279.

In one embodiment, the amount that the player's account is increased can be calculated by a combination of a breakout and pay number resulting in a contribution number. For example, if the player advances 10 yards from the 30 yards out from the goal line (the mid zone), the break out is 8410 and the pay is 4. This results in a contribution of 8410×4=33640/1000000 or 0.03364. By adding all the advancements that the player is able to achieve during game play, the player's account would increase accordingly. In one embodiment, the first down bonus would be 0.09161 which would be added to the contribution if the player achieved a virtual first down.

In one embodiment, a red zone bonus is awarded when the player reaches the red zone in a increasing scale based upon the current position. For example, the following bonus amounts are awarded if the current position is within the designated ranges: 4-19 yards, the bonus is 30; 20-29 yards, bonus is 20; 30-39 yards, bonus is 10; 40-49 yards, bonus is 5; 50-41 (opposing teams yard line), bonus is 2 and 40-31 (opposing teams yard line) bonus is 1. Based upon this scale, there is a greater reward if the current position is farther from the red zone.

In one embodiment, a first down bonus is awarded when the player achieves a first down in an increasing scale based upon the yards that were gained during the corresponding play. For example, Exhibit 14B shows the first down bonus amounts are awarded if the current position is within the designated ranges.

Referring to FIG. 15A, an example of probabilities for advancement from a current position within the near zone is shown if the current position is on the 10 yard line. In one embodiment, the near zone is defined at the distance between the goal line and 10 yards out from the goal line. From FIG. 15A, it can be seen that this embodiment has the probability of advancing from the 10 yard to the 5 yard line as 0.076770. Probabilities are displayed as fractions of 1,000,000 so that the probability 76770 represents 76,770/1,000,000 or 0.07677.

FIG. 15B is an example of probabilities of advancement from a current position within the mid zone is shown if the current position is on the 15 yard line. In one embodiment, the mid zone is defined at the distance between the 30 yard line and the 11 yard line. From FIG. 15B, it can be seen that this embodiment has the probability of advancing from the 15 yard to the 10 yard line as 0.076978. Therefore, the probability of advancing 5 yards is determinative upon the current field position. Referring to FIG. 16, an example of probabilities for advancement from a current position within the deep zone is shown if the current position is on the 50 yard line. In one embodiment, the near zone is defined at the distance between the 4 yard line and the opponent's 31 yard line. From FIG. 16, it can be seen that this embodiment has the probability of advancing from the 50 yards to the opponent's 45 yard line (0.033400).

In one embodiment, the probabilities of advancement in the mid zone and the deep zone can be dependent upon whether the game status is a first down or the second, third or fourth down. Referring to FIG. 17, an example of probabilities for advancement from a current position within the mid zone is shown if the current position is on the 15 yard line and the game status is the first down. From FIG. 17, it can be seen that this embodiment has the probability of advancing from the 15 yard to the 10 yard line as 0.075178.

In viewing the probabilities illustrated in FIGS. 14A through 17, one embodiment shows that the majority of yards advanced, as shown in the first column, have probabilities of 0. This represents that the computer readable instructions provide for advancement in discrete yard distances. For example, in referring to FIG. 17, the possibilities of advancement include only 0, 3, 5, 8, 10 yards and a touchdown for possible gains. The player's experience is therefore enhanced as advances can be made in multi yard stages rather than inching toward to goal line.

FIG. 17 also shows an example of the contribution calculation and the table used for such calculation. As each calculation is associated with yards advanced for each of the deep zone, mid zone, and near zone tables as well as the different tables for the game status being a first down as opposed to the second, third, and fourth down, contributions vary accordingly. For advancing 5 yards under the table shown in FIG. 17, the breakout is 42989 (representing fractions of 1,000,000) and the pay is 2 thereby resulting in a contribution of 0.086.

Therefore, in one embodiment, if the player advances 5 yards while in the mid zone from the 15 yard line, the player's award is 0.086 of the player's initial bet.

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the invention. It is thus to be understood that the invention is not limited to the disclosed embodiments, but modifications and variations in the present invention may be made without departing from the novel aspects of this invention as defined in the claims. It is intended that this invention be limited only by the claims, and the full scope of equivalent arrangements included within the spirit and scope of the claims.

What is claimed is:

1. A gaming machine for wagering on a virtual football game comprising:

an input panel for receiving a player's selection information;

a processor in electronic communication with said input panel and a non-transitory computer readable medium;

a display in communication with said processor for displaying a current position and a game clock;

a set of predefined plays embodied in said non-transitory computer readable medium representing offensive running and passing plays;

a set of kickoff return results embodied in said non-transitory computer readable medium representing kickoff return yardage from a kickoff return;

a deep, mid, and near zone defined by predetermined distances from a goal line;

a deep zone set of play advancement information stored in said non-transitory computer readable medium representing the probability of advancing a predetermined distance toward said goal line when a current position is in said deep zone;

a mid zone set of play advancement information stored in said non-transitory computer readable medium representing the probability of advancing a predetermined distance toward said goal line when said current position is in said mid zone;

a near zone set of play advancement information embodied in said non-transitory computer readable medium representing the probability of advancing a predetermined distance toward said goal line when said current position is in said near zone; and, a set of computer readable instructions that, when executed by said processor, perform the steps of establishing a game clock having a predetermined period of time representing the amount of time remaining to play, displaying said game clock through said display, receiving said player's selection information representing a kickoff reception request through said input panel representing that the player wishes to receive a kickoff, calculating a current field position according to said set of kickoff return results if a touchdown is not achieved, (a) receiving said player's selection information representing an offensive play request from said input panel representing the players play selection from said set of predefined plays, (b) updating said current field position according to said deep zone set of play advancement information if said current position is in said deep zone or according to said mid zone set of play advancement information if said current position is in said mid zone or according to said near zone set of play advancement information is said current position is in said near zone and said game clock is not expired and said goal line has not been reached, repeating steps (a) and (b) until a touchdown is achieved or said game clock expires or a first down is not achieved after four tries and displaying said current position to the player.

2. The gaming machine of claim 1 including:

a set of subsequent down deep zone play advancement information representing a lower probability of advancing from said deep zone if a game status is a second, third or fourth down;

a set of subsequent down mid zone play advancement information representing a lower probability of advancing from said mid zone of said game status is a second, third or fourth down; and, a set of subsequent down rear zone play advancement information representing a lower probability of advancing from said rear zone if said game status is a second, third or fourth down.

3. The gaming machine of claim 1 wherein said set of computer readable instructions include instructions for determining if said current position is in a red zone and increasing a player account value stored on said non-transitory computer readable medium if said current position is in said red zone.

4. The gaming machine of claim 3 wherein said player account is increased according to an increasing bonus scale according to said current field position wherein said bonus scale include increasing bonus awards in relation to greater distances from the current position to said red zone.

5. The gaming machine of claim 1 wherein said set of computer readable instructions include instructions for determining a first down field position, determining if, according to said current field position and said first down field position, a first down is achieved and increasing a player account value stored on said non-transitory computer readable medium if said first down is achieved.

6. The gaming machine of claim 1 wherein said computer readable instructions include instructions for increasing a player account value if said play advancement reaches said goal line.

7. A gaming machine for playing a virtual football game comprising:

a processor in electronic communication with an input panel, a non-transitory computer readable medium, and a display; and, a set of computer readable instructions embodied in said non-transitory computer readable medium that, when executed by said processor, perform the steps of (a) establishing a current field position according to a set of initial kickoff return probabilities, (b) displaying said current field position on said display representing the results from a play of a football game, (c) receiving a play selection request from the user, (d) updating said current field position according to a set of play advancement information embodied in said computer readable medium representing the probability of advancing from said current field position according to said current field position wherein said set of play advancement information contains a deep zone subset of play advancement information, a mid zone subset of play advancement play information and a near zone subset of play advancement information, and (e) displaying said updated current field position to the player through said display.

8. The gaming machine of claim 7 wherein said set of computer readable instructions includes instructions for repeating steps (c) through (e) until said current field position reaches said goal line or a predetermined period of time elapses, represented by a game clock displayed on said display expires or a first down is not achieved after four attempts.

9. The gaming machine of claim 7 wherein said set of computer readable instructions includes instructions for determining a first down field location according to said current field position, determining if said game play results in said current field position exceeding said first down field location and increasing a player account value stored on said non-transitory computer readable medium if said current field position exceeds said first down field location.

10. The gaming machine of claim 7 wherein said set of computer readable instructions includes instructions for determining if said current field position is in a predetermined red zone and increasing a player account value stored on said non-transitory computer readable medium if said current field position is in said red zone.

11. The gaming machine of claim 7 wherein said set of computer readable instructions includes instructions for calculating a contribution associated with yards gained and awarding the player an award for yards gained by multiplying said contribution with a player's wager.

12. The gaming machine of claim 11 wherein said set of computer readable instructions include instructions for calculating said award to the player for yards gained by multiplying the sum of all of said contributions with the player's wager.

13. A gaming machine for playing a game comprising:

a computer processor in electronic communications with a non-transitory computer readable medium and a display;

a set of play advancement information stored on said non-transitory computer readable medium representing the probabilities of advancing down a virtual playing field from a current position having a plurality of sets of discrete position values wherein each one of said sets of discrete position values includes a breakout value, a pay value, and a contribution value;

a deep zone subset of play advancement information, a mid zone subset of play advancement information, and a near zone set of play advancement information contained in said set of play advancement information representing a differing subset of probabilities of advancing down a virtual playing field from a current position; and, a set of computer readable instructions embodied in said computer readable medium that, when executed by said processor, perform the steps of determining a current position value, displaying said current position value to the player on said display, generating a play result value numerically representing the outcome of a game play selected by the player, updating said current position value according to said set of play advancement information and said play results and displaying said updated current position value to the player on said display.

14. The gaming machine of claim 13 wherein said set of computer readable instructions includes instructions for determining if said updated current position value results in an award to the player and increasing a player account value stored on said non-transitory computer readable medium if an award is determined.

15. The gaming machine of claim 13 including:

a red zone embodied in said computer readable medium; and, said set of computer readable instructions includes instructions for determining if said current position value is within said red zone and increasing a player account value stored on said non-transitory computer readable medium if said current position value is in said red zone.

16. The gaming machine of claim 13 wherein:

said set of computer readable instructions includes instructions for determining a first down position according to said current position value; and, determining if said current position value exceeds said first down position and increasing a player account value stored on said non-transitory computer readable medium if said first down position value is exceeded by said medium current position value.

* * * * *